Nov. 8, 1949     J. W. BUTLER     2,487,219
SELF-LOCKING NUT
Filed March 29, 1944

INVENTOR
JOHN W. BUTLER
BY *Johnson & Kline*
ATTORNEYS

Patented Nov. 8, 1949

2,487,219

UNITED STATES PATENT OFFICE 2,487,219

SELF-LOCKING NUT

John W. Butler, Bridgeport, Conn.

Application March 29, 1944, Serial No. 528,533

8 Claims. (Cl. 151—21)

This invention relates to threaded fastening devices, such as nuts and bolts, and more particularly to means for preventing incidental loosening of such devices.

An object of the present invention is to provide a threaded fastening member and locking means therefor, functioning as a single unit, which have improved holding characteristics, and which may be used a large number of times without detriment to the holding powers thereof.

In one form of the invention the fastening member and locking means comprise a threaded nut having integral resilient hardened fingers extending beyond its clamping face to engage and bite into a seating surface of the parts which are being fastened.

In another form, a cap screw is provided with resilient hardened fingers integral with its cap, adapted to engage the seating surface.

The resilient locking fingers may be made extremely heavy and of short length so that the pressure exerted by them on the seating surface is sufficient to securely hold the member against accidental or incidental loosening. In several forms of the invention this pressure is maintained by the flexing of the fingers, and is not a transmitted pressure from the clamping face of the member itself. As a result of this the biting action of the fingers is not extremely severe, and these forms are therefore particularly adapted to use where the fastening must be loosened periodically.

In other forms, the pressure on the seating surface of the locking fingers is maintained by both the flexing action of the latter, and the direct transmission of pressure from the end face of the body of the member. These forms are adapted for use where the fastening member is to be loosened only infrequently.

In still other forms of the invention, where the fastening member is a threaded nut, means are provided for adapting the resilient locking fingers to clamp the screw upon which the nut is carried, in addition to engaging and locking against the seating surface of the fastened parts. By so doing a maximum of locking action is obtained, this being useful where much vibration is encountered, or where permanence of fastening is desired, or both.

Other features and advantages will hereinafter appear.

In the accompanying drawings—

Figure 3:
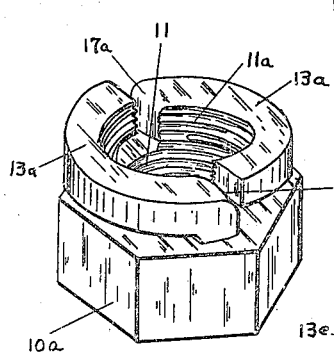

Fig. 3 showing another form of the invention, is a perspective view of a locking nut in which the locking fingers are threaded.

Figure 4:
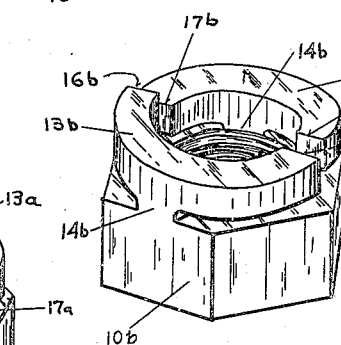

Fig. 4 shows in perspective still another form of locking nut of the invention.

Figure 5:
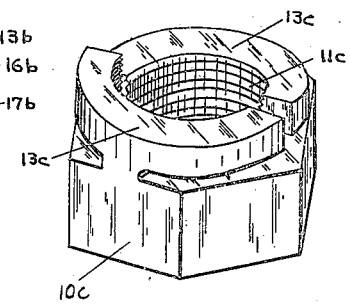

Fig. 5 shows yet another modification, in which the fingers of the nut of Fig. 4 are provided with threads.

Figure 6:
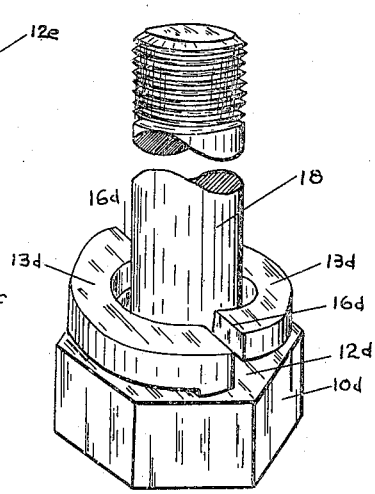

Fig. 6 is a perspective view of a locking cap screw made according to the invention.

Figure 7:
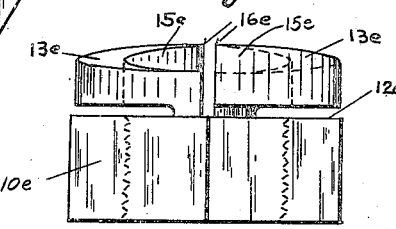

Fig. 7 is a side elevation of another modification of locking nut, and

Figure 8:
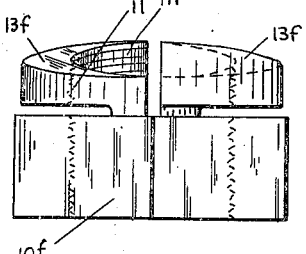

Fig. 8 is a side elevation of a locking nut similar to that shown in Fig. 7, but with threads provided on the locking fingers.

Figure 9:
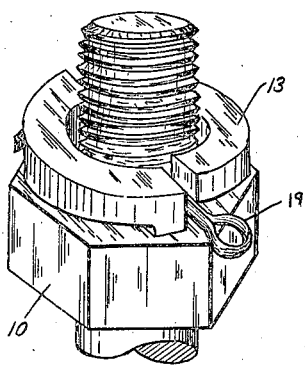

Fig. 9 is a perspective view of a locking nut made according to the invention being used as a castellated nut, with a cotter pin.

Figure 1:
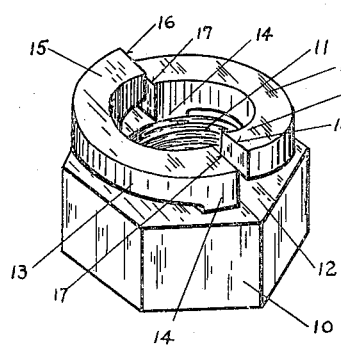
Figure 1 is a perspective view of a self-locking nut made according to the invention.
Figure 10:
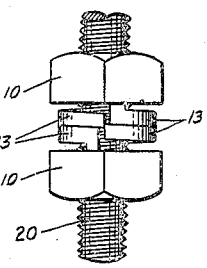
Figure 2:
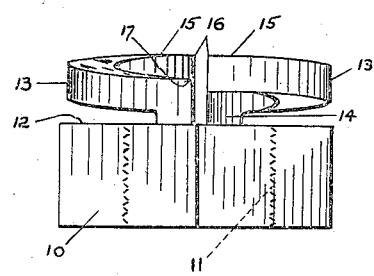
Fig. 2 is a side elevation of the nut of Fig. 1.

Fig. 10 is a side elevation showing two locking nuts of the type illustrated in Figs. 1 and 2, locked together on a tie-rod.

The self-locking nut shown in Figs. 1 and 2 comprises a body 10 having conventional flat side surfaces for a wrench, and having a threaded bore 11 and end face 12. Integral with the body 10 and projecting from the end face 12 there is provided a plurality of resilient locking fingers 13 having portions 14 joining them to the body. The fingers 13 are preferably arcuate and extend concentric with the axis of the bore 11, each following the curve of a separate helix about this axis, so that the movable ends 15 of the fingers are spaced further from the face 12 than the fastened ends.

As seen in Fig. 2, for each of the fingers 13 the movable end 15 thereof extends beyond the adjacent fastened end of the other. Preferably the corners 16 of the movable ends of the fingers are made sharp, although they need not be, and the fingers hardened so that they have a spring temper.

When the nut as shown in these fingers, having a right hand thread, is screwed on a bolt to cause the fingers 13 to firmly engage a seating surface, the fingers will cause the nut to be firmly held against accidental or incidental loosening.

While in their locked-up position, the fingers 13 are flexed so that they lie practically in one circle concentric with the axis of the nut, and the pressure of the movable ends 15 of the fingers is maintained by this flexure. If the nut should begin to turn and loosen due to vibration, etc., the sharp corners 16 of the fingers will bite into the seating surface and prevent any further such action. The cross section of the fingers 13 may be comparatively heavy, and this together with the lead of the helices in which the fingers are located, control the amount of locking or holding action of the nut. Even after severe usage of the nut, when it is loosened the fingers will return to a helical disposition, and subsequent use of the nut will prove as satisfactory as its initial use.

The nut of Figs. 1 and 2 may be used as a locknut when provided with left hand threads, and for this purpose the corners 17 of the fastened ends of the fingers 13 are made sharp instead of the corners 16. According to this use, when the nut is screwed against a seating surface, it is pulled up very tightly. The fingers 13 flex during this operation and eventually lie in a circle, the corners 16 initially engaging the seating surface but not biting into it. Instead, pressure is concentrated on the fastened ends of the fingers 13, and these tend to dig into the seating surface. If the nut should start to loosen the sharpened corners 17, together with the pressure of the ends 15 of the fingers will tend to prevent a continuation of this.

A modified form of the invention is shown in Fig. 3, wherein a right handed nut generally similar to that of Figs. 1 and 2 has hardened resilient locking fingers 13a having threads 11a lying in the same helix as the threads of the bore 11. Preferably the corners 17a of the fingers 13a are rounded to prevent digging into a seating surface. When this nut is screwed tightly against a surface the threads 11a of the fingers 13a distort the threads of the screw, and jam the nut on the latter. Thus a locking to the screw itself is obtained in addition to the action of the fingers against the seating surface.

Another form of the invention is shown in Fig. 4. In this form the end face of the nut body has a pair of locking fingers 13b supported intermediate their ends by portions 14b. Each of the fingers 13b extends along a separate helix about the axis of the body, so that the trailing locking corners 16b of the fingers extend beyond the leading corners 17b thereof. By this arrangement the fingers may be made stiffer for a given cross section; and there is no tendency for the corners 17b to dig into a seating surface, since they at no time engage said surface.

A modification of the form of the invention shown in Fig. 4 is illustrated in Fig. 5, wherein the nut body has hardened resilient fingers 13c having internal threads 11c lying in the same helix as those of the bore 11. When the nut of Fig. 5 is screwed on a bolt so that the fingers 13c engage a seating surface and are flexed thereby, the threads 11c will distort the threads of the bolt and jam the nut on same.

In Fig. 6 a locking cap screw made according to the invention is illustrated. The shank 18 of the screw has a cap 10d and end face 12d, provided with integral locking fingers 13d extending along the path of a theoretical spiral about the shank. The fingers 13d have sharp trailing corners 16d and are hardened so that they engage a seating surface under constant pressure and bite into same should the screw start to loosen.

Another modification of locking nut is shown in Fig. 7. In this modification the fingers 13d of the nut taper with a maximum thickness at their movable ends 15e, so that when the nut is pulled up tightly against a seating surface the thickened ends 15e will transmit pressure directly from the end face 12e to the surface. Thus the locking corners 16e of the fingers tend to dig into the seating surface at the time that the nut is tightened, and before it begins to loosen.

A modified form of the nut of Fig. 7 is shown in Fig. 8. Here the locking fingers 13f are provided with internal threads 11f lying in the same helix as the threads of the bore 11, so that when the nut is pulled up tightly against a seating surface, causing flexing of the fingers 13f of the threads 11f thereof will distort the threads of the screw carrying the nut, and jam the latter on the screw.

A self-locking nut made according to the invention may be employed as a castellated nut, as shown in Fig. 9. In this use, the nut is threaded on the screw so that the locking fingers do not engage the seating surface; instead, the other face of the nut engages this surface, and the space under the fingers may be used to pass a cotter pin 19 through a hole in the screw for locking the nut against loosening.

Two nuts of the type shown in Figs. 1 and 2 may be advantageously locked together on a tie rod 20 or the like, as shown in Fig. 10. For this purpose, the nuts are placed so that the resilient fingers 13 of each face the fingers of the other. The nuts are then turned up against each other, and are held from becoming loose by the tension of the fingers. Due to the interlocking engagement of the free ends of the fingers as shown in the figure, the nuts cannot possibly become disengaged at any time.

Variations and modifications may be made within the scope of this invention and portions of the improvements may be used without others.

I claim:

1. A self-locking nut comprising a body having a threaded bore and an end face; a pair of resilient fingers each fastened by a narrow web intermediate the ends thereof to the end face of the body, said fingers extending beyond said web in practically opposite directions, and one of said fingers extending along a helix about the axis of the nut so that when the latter is tightened against a seating surface said finger will flex and the movable end thereof will engage said surface under pressure maintained by said flexing to prevent incidental loosening of the nut.

2. A bolt having a threaded shank and a head; the undersurface of the head having a resilient finger having one end rigidly fastened to the head and the other end movable and projecting axially beyond its fastened end and beyond the inner face of the head and lying within the periphery of the head so that when the bolt is operated to clamp against a seating surface the finger will flex and the movable end thereof will engage said surface under pressure maintained by said flexing, said fingers biting into the surface to prevent incidental loosening of the bolt.

3. A bolt having a threaded shank and a head; a resilient finger having one end rigidly fastened to the inner face of the head, said finger lying within the periphery of the head and extending along a helix about the axis of the bolt in a direction departing from said end face so that when the bolt is operated to clamp against a seating surface the finger will flex and the movable end thereof will engage said surface under pressure maintained by said flexing and by the backing up of the head to prevent incidental loosening of the bolt.

4. A bolt having a threaded shank and a head provided with a seat-engaging face having a plurality of integral resilient fingers projecting therefrom and lying within the periphery of the head to engage the seat and hold the bolt against casual rotation in the direction to loosen the bolt, said head overlying the fingers whereby the fingers are always held thereby in engagement with the seat.

5. A self-locking nut having a threaded bore and an end face; a pair of resilient fingers, each at one end being fastened to the end face by an integral web extending perpendicular to said end face and having a movable end provided with a uniplanar end surface, the side of the web of one finger and the end surface of the other finger being substantially perpendicular to the end face and in parallel spaced relation, said fingers extending along a helix about the axis of the nut so that when the latter is tightened against a seating surface one of said fingers will flex and the movable end thereof will engage said surface under pressure maintained by said flexing to prevent incidental loosening of the nut.

6. The invention as defined in claim 5 in which the portions of said web furthest from the end face of the nut body has a rounded surface to provide a non-cutting corner on same.

7. The invention as defined in claim 5 in which the portions of said web furthest from the end face of the nut body has a sharp corner to provide a cutting corner on same.

8. A self-locking nut and bolt comprising a bolt having a threaded shank and a head provided with a workpiece engaging face having a plurality of resilient fingers lying within the periphery of the head and projecting therefrom to engage the workpiece; and a nut threaded on said shank and having an end face and a resilient finger having one end rigidly fastened to the end face of the nut and lying within the periphery of the nut and extending along a helix about the axis of the nut in a direction departing from the end face thereof so that when the nut is tightened against the workpiece the fingers will flex and the movable end thereof will engage the workpiece under pressure maintained by said flexing and also being backed up by the head to prevent incidental loosening of the nut.

JOHN W. BUTLER.

REFERENCES CITED

The following references are of record in the file of this patent:

UNITED STATES PATENTS

| Number | Name | Date |
|---|---|---|
| 269,412 | Heaton | Dec. 19, 1882 |
| 1,052,602 | Luyties | Feb. 11, 1913 |
| 1,238,796 | McCollom | Sept. 4, 1917 |
| 1,337,424 | Word | Apr. 20, 1920 |
| 1,351,676 | Myers | Aug. 31, 1920 |
| 1,581,559 | Williams | Apr. 20, 1926 |
| 1,956,745 | Payne | May 1, 1934 |

FOREIGN PATENTS

| Number | Country | Date |
|---|---|---|
| 1,597 | Great Britain | June 22, 1944 |

Certificate of Correction

Patent No. 2,487,219 — November 8, 1949

JOHN W. BUTLER

It is hereby certified that errors appear in the printed specification of the above numbered patent requiring correction as follows:

Column 2, line 42, for the word "fingers" read *figures*; column 3, line 68, for "fingers 13d" read *fingers 13e*; column 6, line 32, list of references cited, for "June 22, 1944" read *Jan. 21, 1914*;

and that the said Letters Patent should be read with these corrections therein that the same may conform to the record of the case in the Patent Office.

Signed and sealed this 7th day of March, A. D. 1950.

[SEAL]

THOMAS F. MURPHY,
*Assistant Commissioner of Patents.*